(12) United States Patent
Fowler et al.

(10) Patent No.: US 11,206,432 B1
(45) Date of Patent: Dec. 21, 2021

(54) SYSTEM AND METHOD FOR PROVIDING SYNCHRONIZED INTERACTIVE MULTIMEDIA CONTENT TO MOBILE DEVICES BASED ON GEOLOCATION OF A VEHICLE

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 17/022,808

(22) Filed: Sep. 16, 2020

Related U.S. Application Data

(63) Continuation-in-part of application No. 16/155,605, filed on Oct. 9, 2018, now abandoned, which is a continuation-in-part of application No. 16/003,092, filed on Jun. 7, 2018, now abandoned.

(60) Provisional application No. 62/516,644, filed on Jun. 7, 2017.

(51) Int. Cl.
| | |
|---|---|
| *G06Q 20/10* | (2012.01) |
| *H04N 21/214* | (2011.01) |
| *G06F 3/048* | (2013.01) |
| *G06Q 30/02* | (2012.01) |
| *G06K 7/14* | (2006.01) |

(52) U.S. Cl.
CPC ....... *H04N 21/2146* (2013.01); *G06K 7/1417* (2013.01); *G06Q 30/0237* (2013.01)

(58) Field of Classification Search
None
See application file for complete search history.

(56) References Cited

U.S. PATENT DOCUMENTS

| | | |
|---|---|---|
| 7,379,886 B1 | 5/2008 | Zaring |
| 7,587,214 B2 | 9/2009 | Inselberg |
| 7,817,990 B2 | 10/2010 | Pamminger |

(Continued)

FOREIGN PATENT DOCUMENTS

| | | |
|---|---|---|
| WO | WO/2008/124168 A1 | 10/2008 |
| WO | WO/2014/081584 A1 | 5/2014 |

(Continued)

*Primary Examiner* — Carl Adams
(74) *Attorney, Agent, or Firm* — Vos-IP, LLC

(57) ABSTRACT

A system has a plurality of machine readable tags, and includes a server system for synchronizing the display of interactive mobile content on a user device with a destination of a vehicle, the system. Each of the machine readable tags encodes an address, and is mounted within the vehicle for access by persons in the vehicle. The system receives a request from the user device, generated by scanning one of the machine readable tags, and determines the destination of the vehicle. A coupon is selected and provided that corresponds with the destination of the vehicle. The users on the vehicle that have selected the coupon for download are determined, each of the users who have downloaded the coupon are notified of the identities of the other users who downloaded the coupon, and transportation of all of the users is facilitated, to the location of the restaurant so they may utilize the coupon which each of them downloaded.

20 Claims, 5 Drawing Sheets

(56) References Cited

U.S. PATENT DOCUMENTS

| | | |
|---|---|---|
| 8,056,802 B2 | 11/2011 | Gressel |
| 8,494,838 B2 | 7/2013 | Donabedian et al. |
| 8,731,583 B2 | 5/2014 | Wengrovitz |
| 8,971,861 B2 | 3/2015 | Gupta et al. |
| 9,002,727 B2 | 4/2015 | Horowitz et al. |
| 9,117,231 B2 | 8/2015 | Rodgers et al. |
| 9,223,750 B2 | 12/2015 | Liu et al. |
| 9,223,885 B2 | 12/2015 | Marsico |
| 9,324,079 B2 | 4/2016 | Moulin et al. |
| 9,405,844 B2 | 8/2016 | Lim et al. |
| 9,451,389 B2 | 9/2016 | Beg et al. |
| 9,681,302 B2 | 6/2017 | Robinson et al. |
| 9,767,645 B1 | 9/2017 | Cronin |
| 9,826,049 B2 | 11/2017 | Lim et al. |
| 9,870,585 B2 | 1/2018 | Cronin et al. |
| 9,883,344 B2 | 1/2018 | Bolton et al. |
| 10,009,429 B2 | 6/2018 | Garcia Manchado |
| 10,163,124 B2 | 12/2018 | Horowitz et al. |
| 10,178,166 B2 | 1/2019 | Sharan |
| 10,942,913 B1 | 3/2021 | Khoyilar et al. |
| 2001/0050310 A1 | 12/2001 | Rathus et al. |
| 2002/0016816 A1 | 2/2002 | Rhoads |
| 2003/0008661 A1 | 1/2003 | Joyce et al. |
| 2003/0041155 A1 | 2/2003 | Nelson et al. |
| 2006/0094409 A1 | 5/2006 | Inselberg |
| 2009/0138920 A1* | 5/2009 | Anandpura ...... H04N 21/41407 725/76 |
| 2010/0184462 A1 | 7/2010 | Lapstun et al. |
| 2010/0228577 A1* | 9/2010 | Cunningham ......... G06Q 10/02 705/5 |
| 2011/0034252 A1 | 2/2011 | Morrison |
| 2012/0011015 A1 | 1/2012 | Singh et al. |
| 2012/0130770 A1 | 5/2012 | Heffernan |
| 2012/0280784 A1 | 11/2012 | Gaviria Velez et al. |
| 2013/0073366 A1 | 3/2013 | Heath |
| 2013/0085834 A1 | 4/2013 | Witherspoon, Jr. et al. |
| 2013/0166384 A1 | 6/2013 | Das |
| 2013/0275221 A1 | 10/2013 | Zeto, III et al. |
| 2013/0297430 A1 | 11/2013 | Soergel |
| 2014/0046802 A1 | 2/2014 | Hosein et al. |
| 2014/0156752 A1 | 6/2014 | Fetyko |
| 2014/0279072 A1 | 9/2014 | Serino |
| 2014/0282684 A1* | 9/2014 | Keen .................... H04N 21/422 725/30 |
| 2015/0073879 A1 | 3/2015 | Acosta-Cazaubon |
| 2015/0081532 A1 | 3/2015 | Lewis et al. |
| 2015/0088658 A1 | 3/2015 | Iiduka et al. |
| 2015/0279164 A1 | 10/2015 | Miller |
| 2016/0086228 A1 | 3/2016 | Babb et al. |
| 2016/0104347 A1 | 4/2016 | Yang |
| 2016/0189287 A1 | 6/2016 | Van Meter |
| 2016/0217258 A1 | 7/2016 | Pitroda et al. |
| 2017/0039599 A1 | 2/2017 | Tunnell et al. |
| 2017/0142460 A1 | 5/2017 | Yang et al. |
| 2017/0330263 A1 | 11/2017 | Shaffer |
| 2017/0337531 A1* | 11/2017 | Kohli ..................... G06Q 20/12 |
| 2019/0220715 A1 | 7/2019 | Park et al. |
| 2020/0327997 A1 | 10/2020 | Behrens et al. |
| 2021/0019564 A1 | 1/2021 | Zhou et al. |
| 2021/0065256 A1 | 3/2021 | Shontz |

FOREIGN PATENT DOCUMENTS

| | | |
|---|---|---|
| WO | WO2015/035055 | 3/2015 |
| WO | WO/2019/016602 A2 | 1/2019 |

* cited by examiner

SYSTEM AND METHOD FOR PROVIDING SYNCHRONIZED INTERACTIVE MULTIMEDIA CONTENT TO MOBILE DEVICES BASED ON GEOLOCATION OF A VEHICLE

CROSS-REFERENCE TO RELATED APPLICATIONS

This application for a utility patent is a continuation-in-part of a previously filed utility patent, currently pending, having application Ser. No. 16/155,605, filed Oct. 9, 2018, which is a continuation in part of application Ser. No. 16/003,092, filed Jun. 7, 2018, which claims priority to U.S. Provisional Application No. 62/516,644, filed Jun. 7, 2017.

BACKGROUND OF THE INVENTION

Field of the Invention

This invention relates generally to systems and methods for providing multimedia content to passengers on-board a vehicle, and more particularly to such a system that disseminates content that is synchronized in real time based on the geolocation of the vehicle.

Description of Related Art

It is estimated that approximately 1.9 billion communication devices will include close range communication functionality for communication with other devices. Close range communication functionality may be, for example, near-field communication (NFC) functionality, Bluetooth functionality, and the like. NFC is a set of standards for communication device vs to establish radio communication with each other by touching them together or bringing them into close proximity, usually no more than a few centimeters. NFC applications include, for example, contactless transactions, data exchange, and the like. Communications devices may also receive information via machine readable code (QR, Snapcode, etc.), and other technologies known in the art, or technologies later developed or adopted.

The prior art teaches various systems and methods for providing content to persons attending an event at a venue, such as a sports event, concert, and other similar location-based events. Examples of these teachings include the following:

Marsico, W.O. 2015035055, teaches a system for performing multiple marketing operations at a sports venue, arena, etc. The system discusses a list of options, such as surveying a user, providing coupons 13, and other related provision of marketing materials. It also teaches enabling a user to order products (e.g., food) at the venue, for delivery to the scanned seat. The system uses a scanable information encoded graphic image, such as a bar code or a quick response (QR) code, near field communication (NFC) code tag, radio frequency identification (RFID) code tag. A mobile communication device such as a smartphone, tablet computer or other mobile computer may include a scan client module for scanning and communicating QR code information (either an app or without). QR code scanning is accomplished by a camera module that is associated with the smartphone or other mobile computing device. The scan-enabled client module communicates the scanned QR code information to an associated server application for collecting, processing and reporting scan data. Marisco, U.S. Pat. No. 9,223,885, teaches a similar system for gathering survey information via a QR code system.

Lim, U.S. Pat. No. 9,826,049, teaches the basic system wherein QR codes or the like are used in hardlink applications (linking a physical object or location with a web link), by which different users may receive different information in response to a user's interaction with a touchpoint. The content delivered to a particular user in response to a hardlink code or a presented hyperlink may be dependent on the time of the scan, the geographic location of the user, a weather condition at the geographical location, personal information associated with the user, a number of previous scans of the code by prior individuals, and any combination of the these or other variables, which may be determined by an originator of the QR code or other party. User devices may be re-directed to alternate content or network addresses based on one or more programmed conditions.

Beg, U.S. Pat. No. 9,451,389, teaches a system for communicating informational content using a near field communication (NFC). Uniquely programmed NFC stickers can be used conjunction with NFC enabled devices, such as a smart phone, to upload a personalized multimedia greeting on a central server. Once the stickers have been distributed, a recipient can tap on the same sticker and play the greeting message using the smart phone. Retail consumers can tap on NFC tags with a smart phone to view product informational content that has been hosted on the central server by retailers and manufactures.

Rodgers, U.S. Pat. No. 9,117,231, teaches an order taking system for ordering menu items for delivery to a station at a premises, such as a table at a restaurant. The system uses a downloaded application, which is used to scan a QR code or NFC tag on a table. The location is identified using the restaurant and table identifier(s) extracted from the QR code. This location is used to identify the correct restaurant menu from the central platform database.

The order may be placed, payment made, and delivery is made to the location corresponding to the QR code. Meter, U.S. 20160189287 teaches a similar food ordering system.

Horowitz, U.S. Pat. No. 9,002,727, teaches a system which uses a QR code (or NFC tag) to direct a client device to send a first request to a first server identified by the URL. In response to the first request, the client device receives from the first server data configured to cause the client device to display, to a user of the client device, at least one of: a video or an interactive web page. Responsive to the data encoded in the QR code, the client device sends to a coupon server identification data associated with a user of the client device, and a request for the coupon server to distribute a digital coupon 13 for an offer associated with an identifier encoded within the QR code to an account associated with the user. The distribution of the coupon 13 may be predicated upon the user of the client device to perform a "predetermined activity" (e.g., watching an advertisement video, etc.) to qualify for the coupon 13.

Lewis, U.S. 2015/0081532, teaches a system that uses a combination of QR Codes and venue specific localized WI-FI to provide mobile venue related services in a covered venue area. The system includes food ordering and similar services, as well as a variety of other services.

The prior art teaches various forms of systems that use QR codes and the like to disseminate multimedia content, and to enable activities such as ordering food, etc. However, the prior art teaches only static systems. The prior art does not teach a system that disseminates interactive media content that is synchronized in real time based on the geolocation and/or destination of a vehicle. The present invention fulfills these needs and provides further advantages as described in the following summary.

SUMMARY OF THE INVENTION

The present invention teaches certain benefits in construction and use which give rise to the objectives described below.

The present invention provides a system for synchronizing the display of interactive mobile content on a user device with a destination of a vehicle. The system includes a plurality of machine readable tags, and a server system having a computer processor and a computer memory. Each of the machine readable tags encodes an address identifiable by the server system, and is operatively mounted within the vehicle for access by persons in the vehicle.

The system performs the following steps: receiving a request from one of the user devices, the request being generated by scanning one of the machine readable tags with the user device; determining the destination of the vehicle; and providing the interactive mobile content that corresponds with the destination of the vehicle. The users on the vehicle have selected the coupon for download are determined, each of the users who have downloaded the coupon are notified of the identities of the other users who downloaded the coupon, and are all present in the same vehicle; and transportation of all of the users who have downloaded the coupon is facilitated, to the location of the restaurant so they may utilize the coupon which each of them downloaded.

A primary objective of the present invention is to provide a system having advantages not taught by the prior art.

Another objective is to provide a system for interacting with a user device via a plurality of machine readable tags that enable the system to provide coupons to the user device based on the geolocation and/or destination of an aircraft.

A further objective is to provide a system that notifies the users, while they are on the aircraft, of an opportunity to travel to a restaurant proximate the airport, as a group with other user passengers.

A further objective is to provide a system that facilitates the transportation of the users to a restaurant in groups via a ride sharing application.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
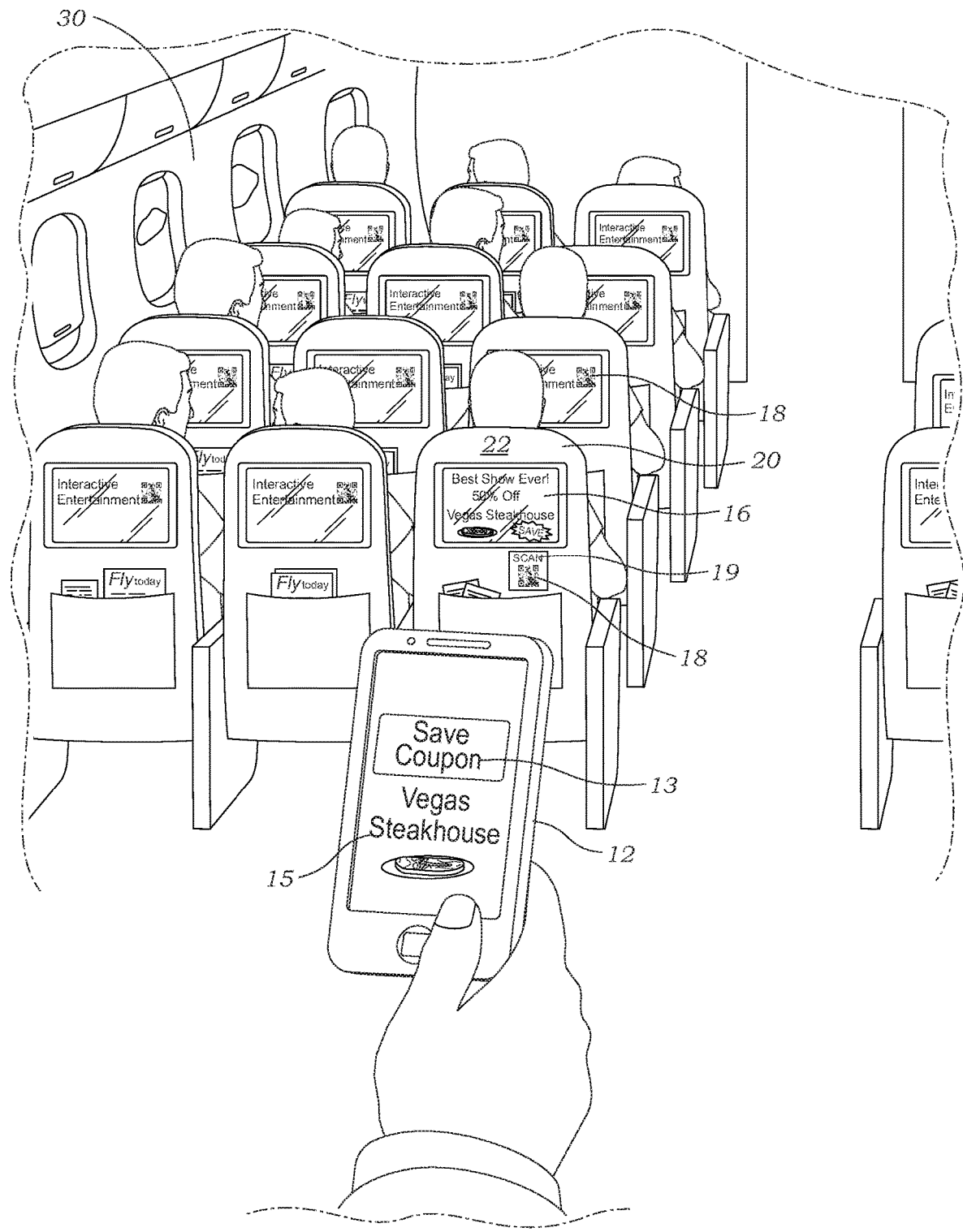
FIG. 1 is a perspective view of a cabin of an aircraft that includes one embodiment of the system interacting with a user device via a plurality of machine readable tags that enable the system to provide interactive mobile content to the user device.

The above-described drawing figures illustrate the invention, a system 10 for interacting with a user device 12 via a plurality of machine readable tags 18 that enable the system 10 to provide interactive mobile content 15 to the user device 12 based on a geolocation and/or destination of a vehicle 30.

For purposes of this application, the term "vehicle" is defined to include any form of mobile vehicle, such as an aircraft, boat, ship, train, automobile, truck, motorhome, bus, and any other forms of vehicle known in the art.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

FIG. 1 is a perspective view of one embodiment of the system 10 installed in an aircraft 30. As discussed above, while an aircraft 30 is illustrated, any other form of vehicle may be similarly adapted for use with this invention. In this embodiment, the system 10 interacts with a user device 12 via a method that utilizes one of a plurality of machine readable tags 18 to enable the system 10 to provide interactive mobile content 15 to the user device 12. The mobile content 15 may be synchronized with the geolocation and/or destination of the aircraft 30 via real-time flight tracking software, as discussed in greater detail below.

In one embodiment, the content 15, such as coupons, is selected as being proximate (e.g., within 30 miles) the destination of the aircraft. Coupons for restaurants that are located proximate the destination airport may be selected for options to each of the users. As discussed below, transportation to the restaurant may also be provided for one or more of the user/passengers.

As shown in FIG. 1, in this embodiment, the plurality of machine readable tags 18 are each positioned in a suitable location within the vehicle 30, in this embodiment adjacent one of a plurality of seats 20 onboard an aircraft 30. In this embodiment, the tags 18 are each generated and displayed on a display screen 16 on a back surface 22 of the seat. The machine readable tag 18 could alternatively be printed on a plate 19 or similar surface mounted on the back surface 22 of at least some of the plurality of seats 20. The tags 18 may be printed or otherwise mounted on or adjacent the seats 20, or placed in other locations adjacent the seats 20 or in other locations of the vehicle 30 (e.g., the floor, ceiling, walls, or other surrounding structures). While one example of this placement is illustrated, this should be broadly construed to include any placement inside of the vehicle 30 that is suitable for use as described herein. For example, on a cruise ship, the tags 18 may be located in each passenger cabin, at points of departure, lounge areas, etc. Alternative placement schemes that may be devised by one skilled in the art, consistent with the teachings of the present invention, should be considered within the scope of the present invention.

Figure 2:
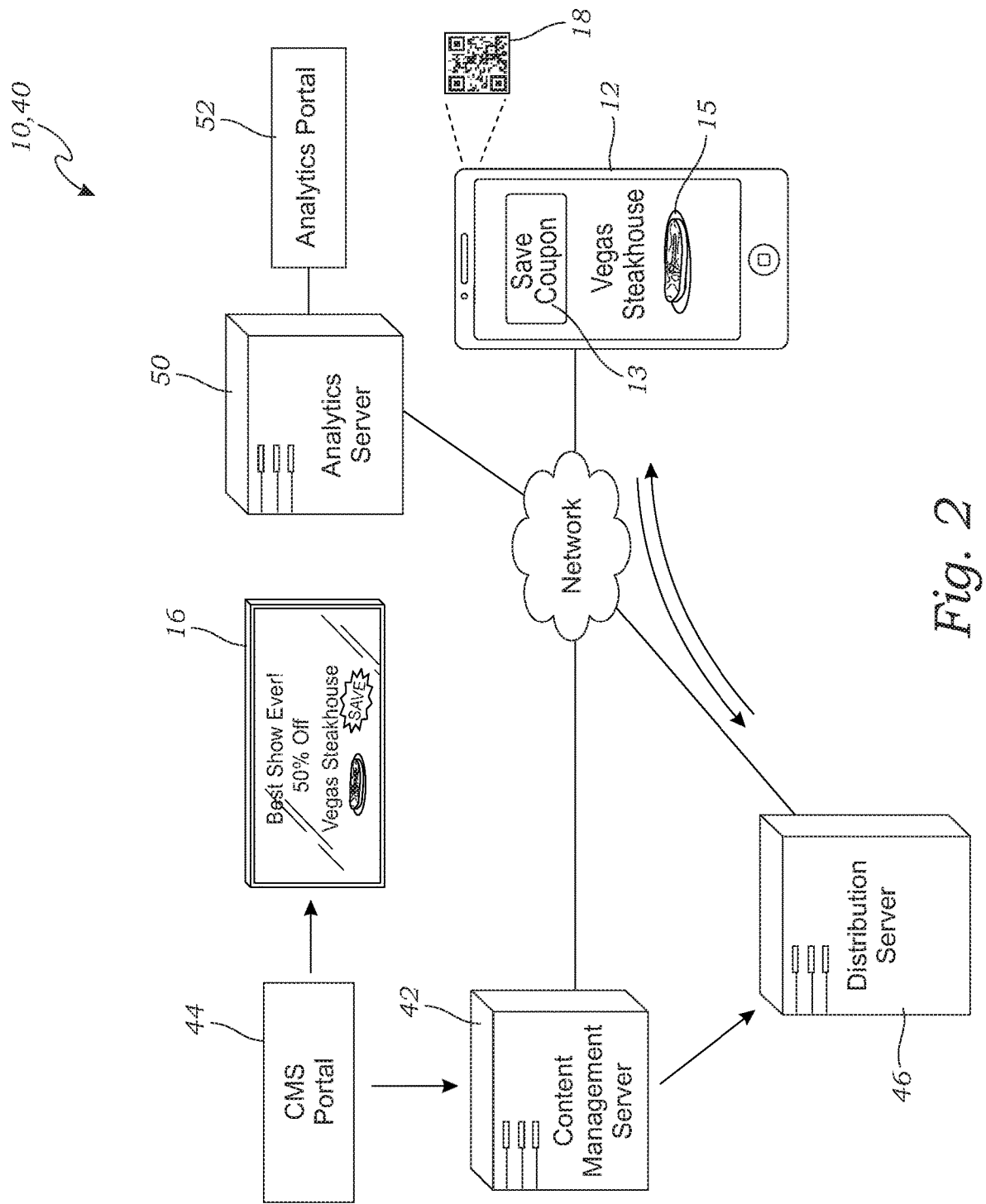
FIG. 2 is a block diagram of one embodiment of the system of FIG. 1.

Each of the machine readable tags 18 encodes an address that will direct the user device 12 to a server system, as shown in FIG. 2 and discussed in greater detail below. For purposes of this application, the term "machine readable tags" should be broadly construed to include any form of bar code, quick response (QR) code tag, near field communication (NFC) code tag, radio frequency identification (RFID) code tag, or any other equivalent device or technology known in the art, or later developed. It may be in the form of a separate piece of material (e.g., metal, plastic, etc.) that is installed in the vehicle 30, or it may be printed or otherwise provided within the vehicle 30 (e.g., printed on or integrally formed with one of the seats 20, or other surfaces or structures of, for example, an aircraft 30).

The machine readable tags 18 are adapted to be read by a user device 12, typically a mobile "smart" phone, although alternatively any form of laptop computer, tablet computer, personal digital assistant (PDA), netbook computer, and the like. The machine readable tags 18 can be programmed to automate tasks, such as, for example, to change phone settings, create and send a text, launch an application, or any number of commands to be executed, limited only by the communication device.

The system 10, as discussed in greater detail below, may be programmed to allow, for example, advertisers, travel companies, promoters, performers, and the like to direct the individuals to a specific webpage, or have the user device 12 perform a specific action when the machine readable tags 18 are scanned by the user device 12 (i.e., by a camera of the user device 12). In the embodiment of FIG. 1, the user may be prompted via video, on-board announcement, written directions, etc., to scan the tag 18 in front of the user. The interactive mobile content 15 may include further elements, such as a coupon 13, and/or any other interactive features desired by one skilled in the art. While some other particular examples are discussed below, it should be understood that countless sales and marketing systems may be implemented using the system 10, and such alternatives should be considered within the scope of the present invention.

In this embodiment, at some point during a trip in the vehicle, such as near the end of a flight to a destination city, the users on the vehicle who have selected the coupon for download are determined, and each of the users who have downloaded the coupon are notified of the identities of the other users who downloaded the coupon, and of whom are present in the same vehicle, in this case an aircraft. Transportation of all of the users who have downloaded the coupon is facilitated, to the location of the restaurant so they may utilize the coupon which each of them downloaded. This may be done via ride sharing amongst the passengers, some of whom may already have cars at the airport, or it may be arranged via a ridesharing application (e.g., UBER®, etc.), via a charter vehicle (e.g., limo), or any other method known in the art.

In other embodiments, the machine readable tags 18 may allow individuals to perform contactless transactions such as, for example, to purchase tickets, order meals, download coupons 13, and shop for merchandise while inside of the aircraft 30. In a typical embodiment, the plurality of machine readable tags 18 are encrypted with data that can be updated remotely on a real time basis via, for example, a URL redirect page, or by sending and launching an application ("app"). In addition, in a typical embodiment, the plurality of machine readable tags 18 are linked together and viewed as a network rather than individual tags 18.

In the embodiment of FIG. 1, the machine readable tags 18 may be positioned on the plate 19 (e.g., metal or PVC plate, or sticker printed with a QR code, or other form of code, and/or containing NFC chips or other similar chips), and are programmed to perform individually designated actions. For example, NFC tags can be programmed to automate tasks such as, for example, allowing for a change of phone settings, a text to be created and sent, turning on a device via Bluetooth, and the like. In a typical embodiment, the system and method 10 allows the plurality of machine readable tags 18 to be programmed to perform various designated actions, allowing operators of the aircraft 30 to cater personalized messages to specific sections or individual seats 20 within the vehicle 30, as well as one designated action for the entire vehicle 30, regardless of seating classes.

As shown in FIG. 1, the display screen 16 may display content that is synchronized with the geolocation of the vehicle, and/or the destination of the vehicle, to advertise a pertinent entertainment, place to eat, etc. A passenger may swipe or scan the user device 12 on the machine readable tag 18, to receive, for example, a special promotional offer that is only offered at the location in which the aircraft 30 is headed, or has landed. This may vary depending upon many factors, such as time of day, weather conditions, and any other local factors that may be pertinent. For example, if the aircraft is going to be landing in Las Vegas in the evening, suitable evening services in this city will be highlighted.

Also, the system 10 maintains the ability to present selected content to passengers located in first class seating, versus coach seating, as discussed in greater detail below. In other embodiments, upon swiping or scanning the user devices 12, individuals may be directed to various advertisers' webpages, depending on when the user device 12 was scanned, so that advertisers can provide multimedia content throughout the flight. As mentioned, the time of day/night may also be incorporated into the media selection criteria. Therefore, an aircraft 30 that is about to land in Las Vegas at night may play an advertisement for a steak restaurant located on the Vegas strip on the screen 16 located on the back of the seat, and simultaneously the user device 12 would be directed to a web site that contains a coupon 13 for download for that steak house. Alternatively, an aircraft 30 that is about to land in the morning in Los Angeles will receive programming and coupons 13 or other promotional offers related to breakfast options near LAX. This may include any form of entertainment, dining, hotels, shows, etc., that may be of interest to a traveler at the designated location at the designated point in time (e.g., time of day, day of week, time of year, etc.). This is discussed in greater detail below.

Mobile payment is a rapidly expanding business segment, and NFC applications, e.g. contactless transactions, are expected to be the most widely adopted form of mobile payments. Embodiments of the invention provide individuals with the ability to establish radio communication between their user devices 12 and the plurality of machine readable tags 18 by touching them together or bringing them into close proximity, usually within a few centimeters, via NFC. In some embodiments, the plurality of machine readable tags 18 may also have the ability to download a digital coupon 13 onto the user devices 12, which could be redeemed at a local event or retail location. This provides concession owners, retail owners, and advertisers an ability to immediately see the conversion rate of a coupon 13 that is issued (i.e., 100 coupons 13 were scanned via the plurality of machine readable tags 18 were redeemed). These digital coupons 13 could be redeemed at a specific geographic area, or worldwide.

In a typical embodiment, each of the plurality of machine readable tags 18 has a unique identification number that is stored within a database, allowing a specific message to be delivered to each of the plurality of machine readable tags 18 in the aircraft 30 at a given time. This enables individuals to order meals to be delivered to their seats 20 by scanning the plurality of machine readable tags 18 with their device, and being directed to a webpage. This is especially useful because it can be accomplished via a standard mobile web browser, versus requiring the user to download an application onto their user device 12.

Along with remotely updating the plurality of machine readable tags 18 with URL redirecting technology, the server system 40 (shown in FIG. 2) is configured to collect and aggregate analytical data every time the machine readable tags 18 are scanned. The analytical data may be, for example, date and time, GPS location of a machine readable tag 18, type of communication device used to scan a machine readable tag 18, orientation of a user device 12 when the machine readable tag 18 was scanned, and/or type of operating system of the user device 12 that scanned the tag 18. The server system 40 (of FIG. 2) then couples the collected analytical data from the physical scanning of machine readable tag 18 with data collected once the individual is directed to a webpage. In a typical embodiment, the data may be, for example, time spent on a webpage, purchases made, IP address, personal information input by the user, and/or products viewed. Such data is of high value to, advertisers, airline company owners, local business owners, and the like, as it provides extensive insight into consumers' purchasing and web browsing habits. This embodiment could also be used to allow for real time data/polling of passengers, i.e., flight satisfaction survey, etc.

In a typical embodiment, remotely updated, machine readable tag programming allows individuals to download digital coupons 13 directly to their user devices 12 and transfer the digital coupon 13 to other user devices 12. For example, upon bringing a user device 12 in close proximity to a machine readable tag 18, an individual may be directed to a webpage with a downloadable digital coupon 13 for 10% off at a local retail store. If the individual transfers the digital coupon 13 from his/her user device 12 to, for example, five other user devices 12 within a fixed time period, e.g., one week, the coupon 13 offer automatically upgrades from 10% to 20% off at the local retail store. This capability incentivizes individuals to transfer their digital coupons 13 to family and friends so that they will receive greater discounts. Also, this capability will allow brands and retailers to watch their promotion go viral from a first point of download to various locations to which the coupons 13 are transferred between user devices 12. They may also be shared and tracked via NFC, MMS, and Text Message, or social media such as Facebook, Twitter, Snapchat, and the like. Mobile coupons 13 may be browser based or stored into users' digital wallets located on their user device 12.

FIG. 2 is a block diagram of one embodiment of the system of FIG. 1. As shown in FIG. 2, in this embodiment, the system 10 includes a server system 40 that is operably connected to a network. For purposes of this application, the term "server" (or any other similar term, such as "computer," "computer device," "electronic device," "user device," etc.), refers to any form of electronic device or plurality of devices having at least one computer processor, e.g., a central processing unit (CPU), and some form of computer memory having the capability to store data. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, or any form of electronic device capable of functioning as described herein. Furthermore, while multiple devices may be used, as shown in FIG. 2, these may all be performed on a single computer device, or multiple associated computer devices, according to the teachings of one skilled in the art.

In the embodiment of FIG. 2, the server system 40 includes a content management server 42, a distribution server 46, and an analytics server 50. In the embodiment of FIG. 2, the server system 40 is operably connected to a network (such as the Internet) to enable the content management server 42, the distribution server 46, and the analytics server 50 to operably interact with the user devices 12, and to provide the necessary content to the user devices 12, and to the screens 16.

A content management portal 44, generated by the content management server 42, may be used to determine the content that is correlated with the current geolocation or destination, and transmit the content to the display screens 16 of the vehicle 30. It may also be used to determine the mobile content 15 that is provided, via the distribution server 46, to the user devices 12.

An analytics portal 52 generated by the analytics server 50 may be used to operatively generate, display, and report analytics data regarding the operation of the system 10. Some components, such as the analytics server 50, may not be included in some embodiments, and other additional components may be included in alternative embodiments. The configuration and function of these servers is discussed in greater detail below.

The term "computer memory" as used herein refers to any tangible, non-transitory storage that participates in providing instructions to a processor for execution. Such a medium may take many forms, including, but not limited to, non-volatile media, volatile media, and any equivalent media known in the art. Non-volatile media includes, for example, ROM, magnetic media, and optical storage media. Volatile media includes, for example, DRAM, which typically serves as the main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

Furthermore, the term "database" as used herein, refers to any form of one or more (or combination of) relational databases, object-oriented databases, hierarchical databases, network databases, non-relational (e.g. NoSQL) databases, document store databases, in-memory databases, programs, tables, files, lists, or any form of programming structure or structures that function to store data as described herein.

Figure 3:
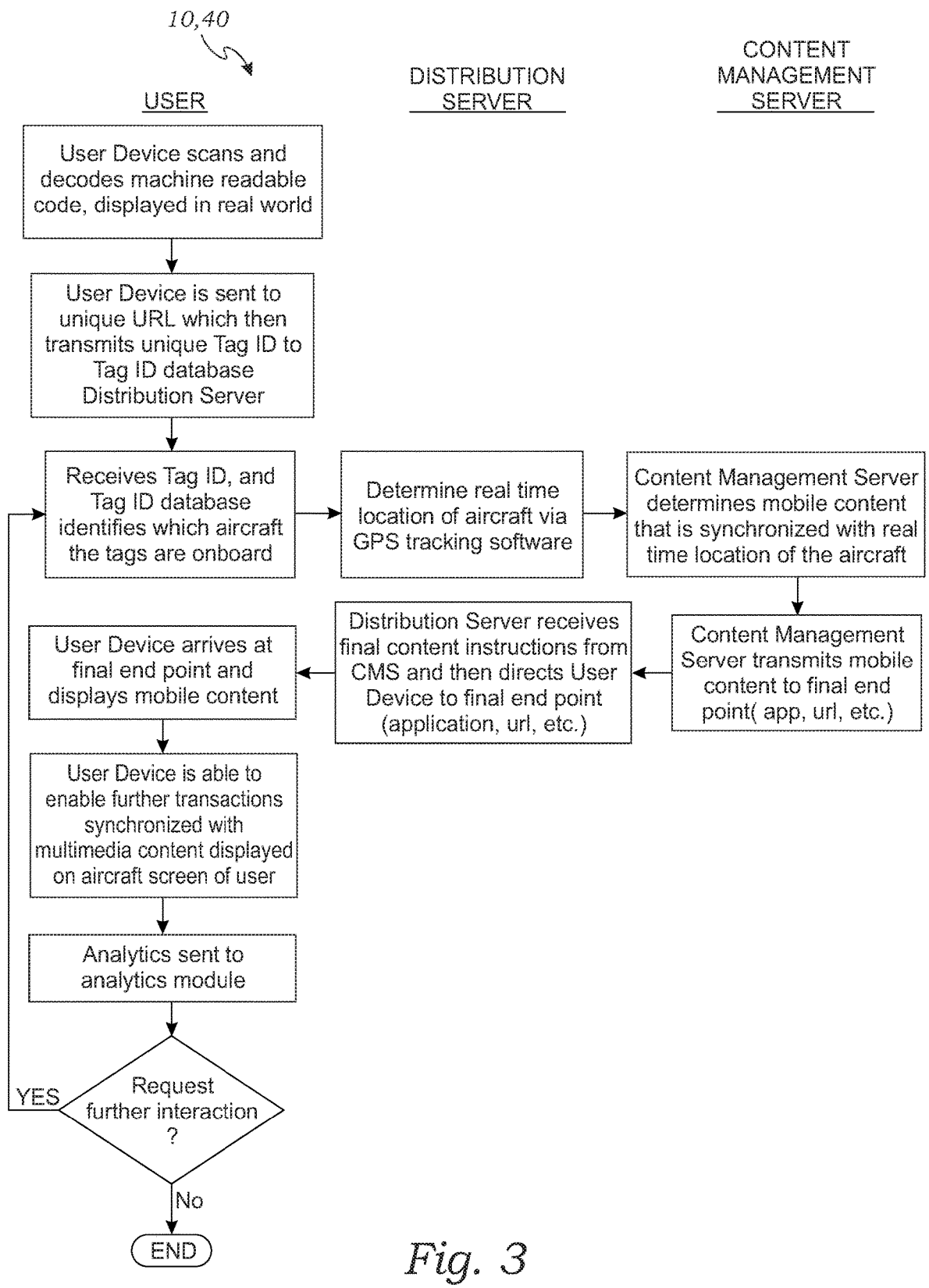
FIG. 3 is a flow diagram illustrating the operation of the system to provide synchronized mobile content to the user device.
Figure 4:
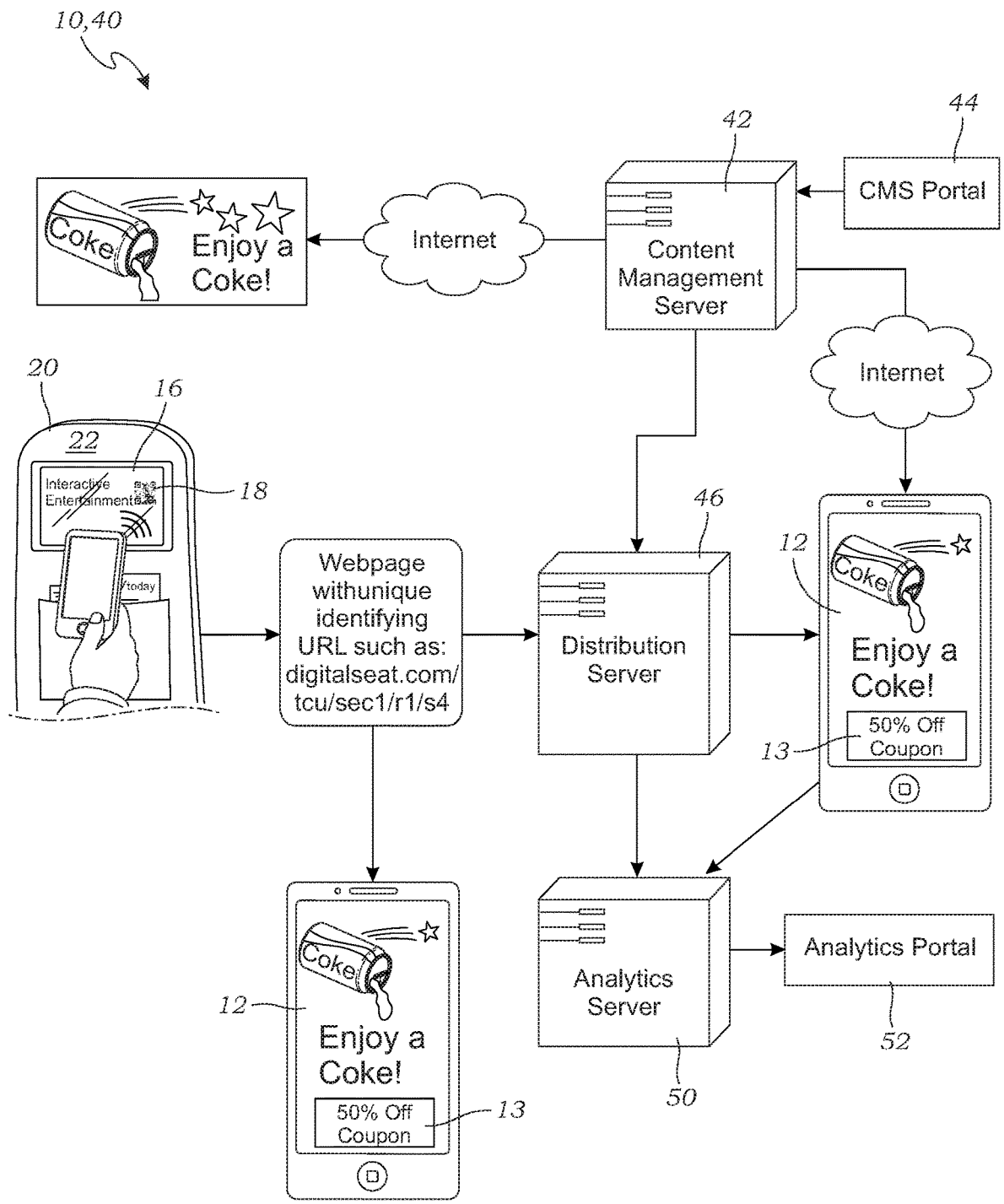
FIG. 4 is a block diagram illustrating the function of one embodiment of the system.

FIG. 3 is a flow diagram illustrating the operation of the systems 10 to provide synchronized mobile content 15 to the user device 12, and multimedia content to the display screens 16 of the aircraft. FIG. 4 is a block diagram illustrating the function of the system 10. As shown in FIGS. 1-4, the computer memory of the server system 40 (of FIG. 1) stores executable code that enables the server system 40 to perform a process that comprises multiple steps, as discussed in greater detail below.

First, a user device 12 is used to scan the machine readable tag 18, as shown in FIG. 1. This scanning enables the user device 12 to be is sent to a unique URL, using methods known in the art. A unique tag ID from the tag 18 is sent to the server system 40 to determine either the current location of the vehicle 30. This may be determined with reference to a flight database that includes the location of the aircraft or other vehicle, or via the GPS determined location of the user device 12 using GPS tracking software available on the market, or the location of the destination of that specific aircraft 30, based on publicly flight data.

The content management server 42, shown in FIG. 2, determines the mobile content 15 that is synchronized with the real time location of the aircraft, and/or the intended destination of the aircraft, and this content is provided to the final endpoint that is provided to the mobile device 12. The mobile content 15 is then displayed on the user device 12. Once the mobile content 15 has reached its final end point, the user device 12 is able to perform further synchronized transactions.

The analytics server 50 is used to store analytics information in a suitable database, which may be stored and accessed via an analytics portal 52, as seen in FIG. 2. The analytics portal 52 may generate a suitable GUI interface to enable data to be collected, stored, and reported, either via the system 40, or exported to any interested parties, customers, marketers, advertisers, etc.

The server system 40 may also provide multimedia content to the display screens 16 of the vehicle, which are synchronized with the mobile content 15 provided to the user device 12. As shown in FIGS. 2-4, in this embodiment, the content management server 42 receives a request from the distribution server 46, and determines the mobile content 15 that should be sent to the user device 12. The mobile content 15 is selected to be synchronized with the real-time geolocation of the aircraft 30. The geolocation distribution server 46 receives final content instructions from CMS 42, and directs the user device 12 to the final end point (application, URL, etc.). The user device 12 then displays the mobile content 15 to the user. The interactive mobile content 15 that corresponds with the geolocation of the aircraft 30 may be provided, and updated, in real-time. For the purposes of this application, the term "real-time" means any interactions that are provided within 10 seconds of passing through location coordinates. Since this is synchronized with, in this embodiment, the aircraft's 30 geolocation, this enables the user device 12 to engage in many synchronized activities, transactions, etc. based on its location.

As shown in FIGS. 2-4, these interactions are occurring, analytics of the user activities, etc., may be directed to the analytics server 50 for collection. Marketers may then access this information via an analytics portal 52 to guide further promotions, etc. Providing interactive mobile content 15 may include steps of generating a website that includes the desired content, and transmitting the website to the user device 12. In one embodiment, the content management portal 44 performs the following steps in conjunction with the server system 40: customizing the media content and the interactive mobile content 15 based on real-time geolocation data received from an aircraft location distribution server 46, and, responsive to commands in real-time, transmitting the customized interactive mobile content 15 to the user devices 12.

Providing interactive mobile content 15 may also include the steps of generating the desired content in a format for use in a mobile application, and transmitting the mobile application and the desired content to the user device 12. In one embodiment, the system 10 utilizes a cloud based application (or "app"). For the cloud based app to work, it is written (in a suitable format for IOS, Android, etc.) and then either loaded onto the cloud based platform, or ported into a cloud based OS. Once in the cloud platform, the app can be accessed from a user device 12 and displayed as if it were running natively on the user device 12. In operation, once the user scans the tag, the geolocation distribution server 46 receives the incoming user scan, then asks the content management server 42 where it should point the user, and then directs the user device 12 to display the cloud based application. The content management server 42 may include the ability to change the content on the cloud based application independently or in conjunction with the geolocation of the user device 12.

In another embodiment, the system 10 utilizes an "instant app." Instant apps download small samples of an application onto a user device 12, which will then run as a full application without the need for a physical download by the user. An instant app differs from a cloud based app because it may download a small amount of information onto the user device to enable operation. In use, once the user scans the tag, the geolocation distribution server 46 receives the incoming user scan, then asks the content management server 42 where it should point the user, and then directs the user device 12 to display the instant application. The term "instant app" refers to any application that can be opened before requiring installation by the user on any manner of mobile device operating system.

Figure 5:
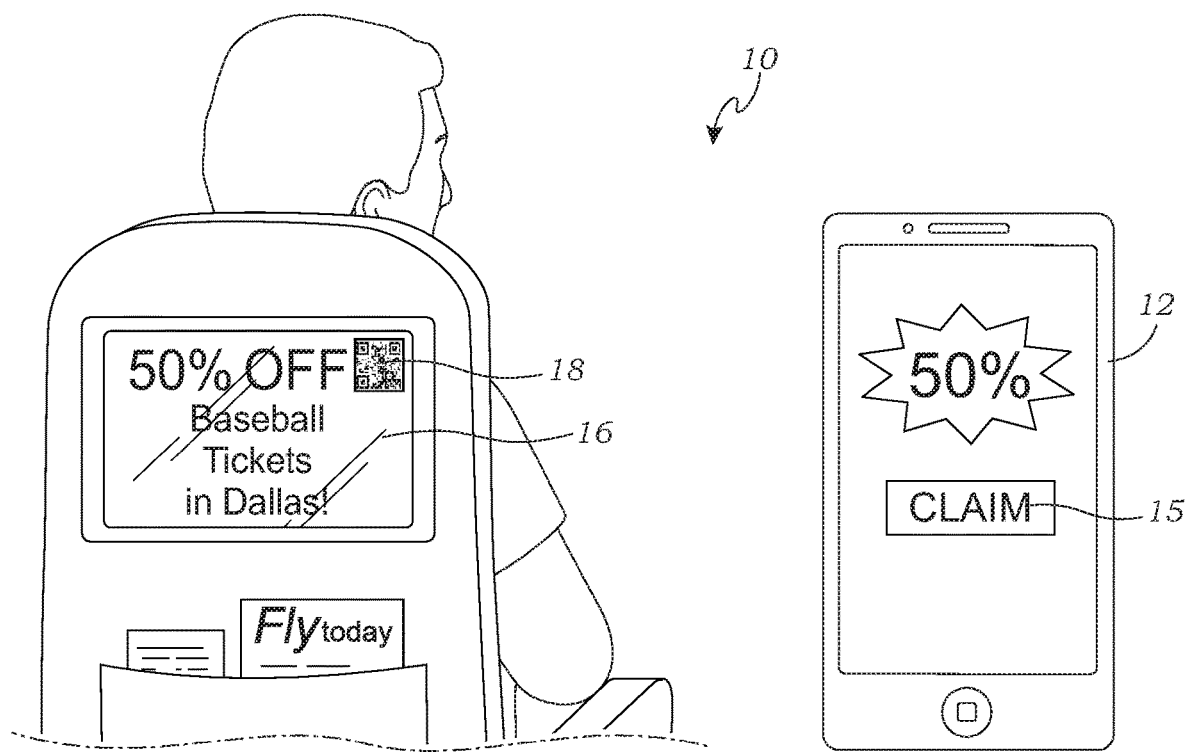
FIG. 5 is a second embodiment of the system of FIG. 1.

FIG. 5 is another embodiment of the system 10 of FIG. 1. In this embodiment, multimedia content is displayed on the display screen 16 of the vehicle, the multimedia content being directed to an entertainment (in this case, a baseball game) that is occurring in the destination city. When the user scans the machine readable tag 18, the user device 12 is directed to content that includes a coupon 13 for the baseball game. The coupon 13 is synchronized with the multimedia being displayed on the display screen 16. The link for the discounted tickets could only be accessed via the machine-readable tag 18 in that specific aircraft 30, or other aircraft flying to Dallas.

Figure 6:
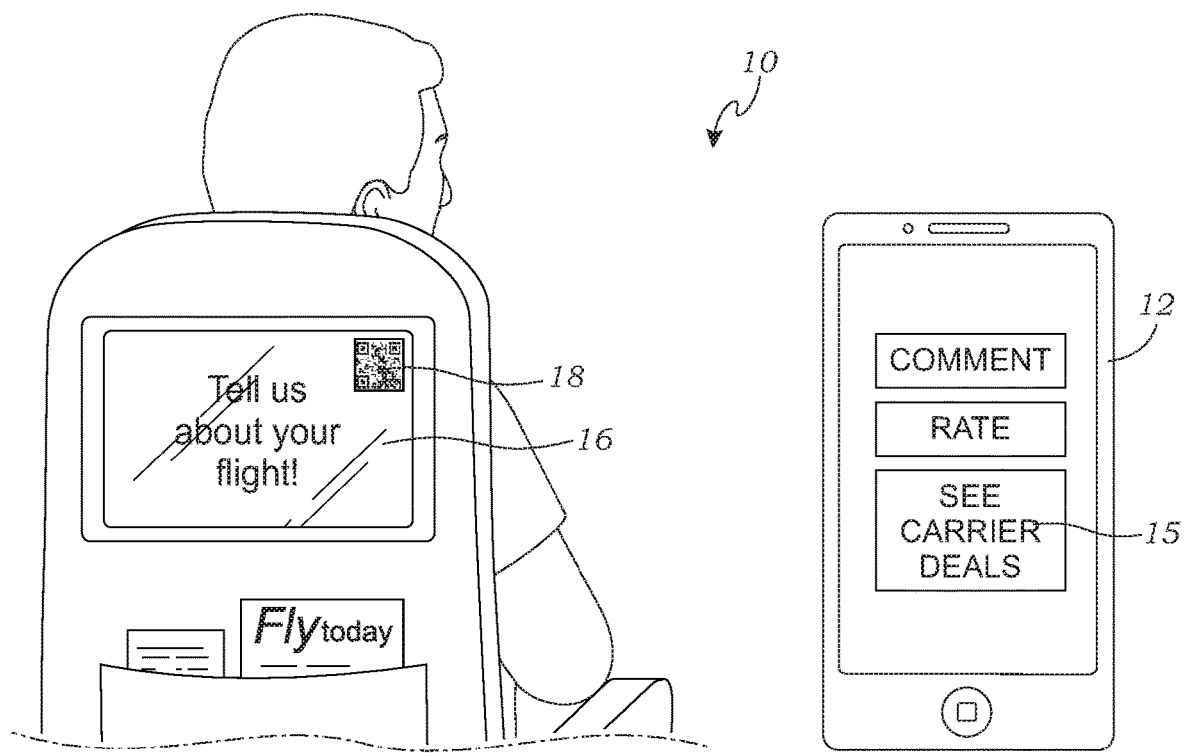
FIG. 6 is a third embodiment of the system of FIG. 1.

FIG. 6 is another embodiment of the system 10 of FIG. 1. The machine readable tags 18 may provide customized interactive mobile content 15, which may include an opportunity for the user to provide feedback regarding real-time activities. The opportunity for the user to provide feedback may include, e.g., a survey of the user's opinion, a comment field for the user to provide a comment, and/or an opportunity to upload a photo, video, or other form of media, for inclusion in further multimedia production. In one embodiment, a multimedia production may be presented on display screens 16 within the aircraft 30 via scheduling software, and may include an invitation for viewer response. The machine readable tags 18 have the ability to sync to the multimedia production, which may include a call to vote (or otherwise interact) regarding the media. It may also include feedback regarding the interaction, such as the current results of the vote. This may also or alternatively include other forms of feedback, responses, comments, text messages, etc., such as may be devised by one skilled in this art.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A system for providing interactive mobile content to a user via a user device based upon a destination of a vehicle, the system comprising:
   a plurality of machine readable tags;
   a server system having a computer processor and a computer memory, the computer memory storing the interactive mobile content so that it is accessible to the server system;
   each of the machine readable tags encoding an address identifiable by the server system, each of the machine readable tags being operatively mounted within the vehicle for access by persons in the vehicle; and
   wherein the computer memory of the server system stores executable code that, when executed, enables the server system to perform a process that comprises the following steps:
      receiving a request from one of the user devices, the request being generated by the user scanning one of the machine readable tags with the user device;
      determining the current geolocation of a vehicle;
      determining the destination of the vehicle in which the user is riding;
      determining a coupon for a restaurant from the interactive mobile content that is suitable based upon the location of the restaurant being proximate the destination or current geolocation of the vehicle;
      offering the coupon to the user;
      receiving a selection of the coupon from the user;
      providing the coupon to the user device, for storage in a digital wallet of the user device;
      determining which of the users on the vehicle have selected the coupon for download;
      notifying each of the users who have downloaded the coupon of the identities of the other users who downloaded the coupon and are all present in the same vehicle;
      facilitating transportation of all of the users who have downloaded the coupon to the location of the restaurant so they may utilize the coupon which each of them downloaded; and
      facilitating the transportation of the users in groups via a ride sharing application.

2. The system of claim 1, wherein the server system performs the following additional steps:
   providing media content to a display screen mounted in the vehicle based on the real-time geolocation of the vehicle;
   synchronizing the interactive mobile content with the media content being displayed on the display screen; and
   responsive to commands in real-time, transmitting the interactive mobile content to the user device, which is synchronized with the media content which is being displayed on the display screen of the vehicle.

3. The system of claim 2, wherein the customized interactive mobile content includes an opportunity for the user to provide feedback regarding the real-time actions within the vehicle.

4. The system of claim 3, wherein the opportunity for the user to provide feedback includes a survey of the user's opinion.

5. The system of claim 3, wherein the opportunity for the user to provide feedback includes a comment field for the user to provide a comment.

6. The system of claim 3, wherein the opportunity for the user to provide feedback further includes incorporating the feedback into the customized media content provided to the display screen.

7. The system of claim 2, wherein the step of providing the interactive mobile content comprises the steps of generating a web site that includes desired content and transmitting the web site to the user device.

8. The system of claim 2, wherein the step of providing the interactive mobile content comprises the steps of generating the desired content in a format for use in a mobile application and transmitting the mobile application and the desired content to the user device.

9. The system of claim 1, wherein the machine readable tags each include a QR code, a snapcode, a near field communication (NFC) code tag, or a radio frequency identification (RFID) code tag.

10. The system of claim 1, wherein the machine readable tags are each positioned adjacent one of a plurality of seats in said vehicle.

11. The system of claim 10, wherein the machine readable tags are on plates which are each mounted on back surface of at least some of a plurality of seats in the vehicle.

12. The system of claim 10, wherein the machine readable tags are displayed on the display screen positioned on a back surface of at least some of a plurality of seats in the vehicle.

13. A system for distributing interactive media content to a user device in real time based on geolocation comprising:
   a machine readable tag;
   a server system having a computer processor and a computer memory, the computer memory storing the interactive mobile content so that it is accessible to the server system;
   said machine readable tag encoding an address identifiable by the server system, said machine readable tag being operatively positioned within a vehicle for access by persons in the vehicle; and
   wherein the computer memory of the server system stores executable code that, when executed, enables the server system to perform a process that comprises the following steps:
      receiving a request from the user device, the request being generated by scanning of the machine readable tag with the user device;
      determining a current geolocation of the user device;

determining the interactive media content, in the form of a coupon, that is suitable based upon the current geolocation of the user device;

providing the coupon for storage in a digital wallet of the user device;

determining which of the users in the vehicle have selected the coupon for download;

notifying each user who has downloaded the coupon of the identities of other users in the same vehicle who have downloaded the coupon; and using ride sharing, facilitating transportation of at least a portion of the users who have downloaded the coupon to a location that enables utilization of the coupon.

14. The system of claim 13 wherein the geolocation of the user device is updated upon the server system being queried and generates a new geolocation, wherein the new geolocation provides new interactive media content to the user device.

15. The system of claim 13 wherein the interactive media content is a coupon for a restaurant.

16. The system of claim 13 wherein the system receives a destination location of the vehicle, and wherein the interactive media content is provided corresponding to both the current geolocation and the destination location.

17. The system of claim 13 further comprising a display screen integral with the vehicle, the display screen displaying content to at least one user in the vehicle, and wherein the coupon relates to currently displayed content.

18. The system of claim 17 wherein the display screen is displaying a live event at a destination of the vehicle and the coupon is for the live event.

19. The system of claim 13 wherein suitability of the coupon is based on the time of day at a destination of the vehicle, a weather forecast at the destination of the vehicle, or both.

20. The system of claim 13 wherein seats in the vehicle have different price points and suitability of the coupon is based on the price point of a seat in which the user is sitting.

* * * * *